US006965483B2

(12) United States Patent
Lindblom

(10) Patent No.: US 6,965,483 B2
(45) Date of Patent: Nov. 15, 2005

(54) IMAGING SYSTEM COMPRISING A CONCAVE MIRROR

(75) Inventor: Peter Lindblom, Skarpnäck (SE)

(73) Assignee: Andor Technology Plc (IE)

( * ) Notice: Subject to any disclaimer, the term of this patent is extended or adjusted under 35 U.S.C. 154(b) by 0 days.

(21) Appl. No.: 10/311,051

(22) PCT Filed: Jun. 7, 2001

(86) PCT No.: PCT/SE01/01281
§ 371 (c)(1),
(2), (4) Date: Mar. 14, 2003

(87) PCT Pub. No.: WO01/96912
PCT Pub. Date: Dec. 20, 2001

(65) Prior Publication Data
US 2003/0165024 A1 Sep. 4, 2003

(30) Foreign Application Priority Data
Jun. 15, 2000 (SE) .............................................. 0002233

(51) Int. Cl.[7] ............................. G02B 6/34; G02B 17/00
(52) U.S. Cl. ........................ 359/726; 359/727; 385/37; 385/24
(58) Field of Search ................................ 359/716, 727, 359/728, 867; 385/37, 24

(56) References Cited

U.S. PATENT DOCUMENTS

| 3,836,263 A | | 9/1974 | Rickert ....................... 356/251 |
| 4,395,095 A | * | 7/1983 | Horton ........................ 359/365 |
| 4,550,973 A | | 11/1985 | Hufnagel ..................... 359/19 |
| 2003/0026541 A1 | * | 2/2003 | Sappey et al. ................ 385/37 |

* cited by examiner

*Primary Examiner*—Timothy Thompson
(74) *Attorney, Agent, or Firm*—John W. Carpenter; Carpenter & Kulas, LLP

(57) ABSTRACT

The invention concerns a system for achieving an optical image of an object (136), and/or for achieving optical collimation (137) of light from a light source (130), comprising a concave mirror (131: 134), the surface normal of which forms an angle with the incident light in a beam. A negative lens (132, 133) that co-operates with the concave mirror is arranged in the incident and/or exit beam paths such that an image with eliminated or reduced imaging aberrations is achieved in a focal plane (135), and/or that the exit light from a light sources (130) is collimated (137).

20 Claims, 4 Drawing Sheets

IMAGING SYSTEM COMPRISING A CONCAVE MIRROR

TECHNICAL AREA

The present invention concerns a system including a concave mirror or equivalent means for achieving an optical image of an object, and/or for achieving optical collimation of light from a light source.

PRIOR ART

Optical imaging is usually achieved by exploiting the diffraction, or refraction, of light in lenses, or by exploiting the reflection of light in mirrors.

A lens provides an image that varies with the wavelength of the light, a phenomenon known as chromatic aberration. The reason for this is that the said refraction depends on the wavelength of the light, that is, an object is imaged in different wavelengths onto different focal planes. This is remedied by combining two or more lenses of different optical materials that have refractive properties such that the said object is imaged onto approximately the same focal plane at all wavelengths. This method of obtaining what are known as achromatic lens systems works well over a limited range of wavelengths, such as, for example, the visible region of wavelengths that stretches from a wavelength of 400 nm to a wavelength of 700 nm. Most lens systems, such as, for example, the objective lens of a camera, are optimized for this range of wavelengths. It is desired in many applications to produce imaging systems that can image objects over a significantly greater range of wavelengths. The imaging lens systems in these applications become very complex. Furthermore, if it is desired to include what is known as the ultraviolet range of wavelengths for the imaging, the number of available optical materials is considerably reduced since many materials are not transparent to ultraviolet light. The achievement of a lens system for imaging without chromatic aberration in the wavelength region from 200 nm to 1,200 nm is extremely difficult, if not impossible. Images in the said range of wavelengths, however, have considerable significance for applications including, among others, optical spectroscopy.

On the other hand, a concave mirror provides imaging without chromatic aberration since the reflection of light does not depend on wavelength. However, this image arises in the incident light beam path. This has been remedied by introducing the registration of the image in the said beam path or by obtaining the focal plane outside of the same by the use of mirrors placed into the beam path. Both methods mean that the central part of the beam is blocked. This is acceptable in many cases, such as, for example, in astronomical telescopes. In other cases, such as, for example, the objective lens of a camera, it leads to a complication that among other things limits the depth of focus of the objective.

One method of alleviating the said disadvantages is to tilt the mirror towards the incident beam such that the image in the focal plane arises outside of the said beam. A general name for this type of optics is "non-axial", which means that the optical components that are part of the system do not have cylindrical symmetry with respect to a central optical axis. This introduces a significantly higher degree of difficulty in achieving an image with the aid of spherical surfaces without imaging aberrations. In the said case using a tilted concave mirror, this must have a non-spherical or spherical surface shape, which involves a considerable increase in cost since these surfaces are very difficult to produce.

SUMMARY OF THE INVENTION

The said disadvantages, namely, the difficulty of obtaining achromatic images over a wide range of wavelengths with lens systems, the difficulties of obtaining a complete beam with axial mirror systems, and, finally, the difficulties of reducing imaging aberrations with non-axial optics, are eliminated with the present invention, which is principally characterized in that at least one lens with preferably a low negative power is placed in the incident beam path and/or in the exit beam path. The lens is placed in the said beam path such that the normals to both surfaces of the said lens form an angle with a central ray in the said beam path, whereby the said lens and the said mirror cooperate not only in achieving an image of the maid object in a focal plane outside of the said incident beam, but also in eliminating or reducing imaging aberrations in the said image. Alternatively, the said mirror and lens cooperate in order to collimate the exit light from a light source placed beside the said image.

Other characteristics of the invention are made clear by the accompanying claims.

BRIEF DESCRIPTION OF THE DRAWINGS

The invention will be described in more detail below with the aid of embodiments shown in the accompanying drawings, in which.

DETAILED DESCRIPTION OF PREFERRED EMBODIMENTS

Figure 1A:
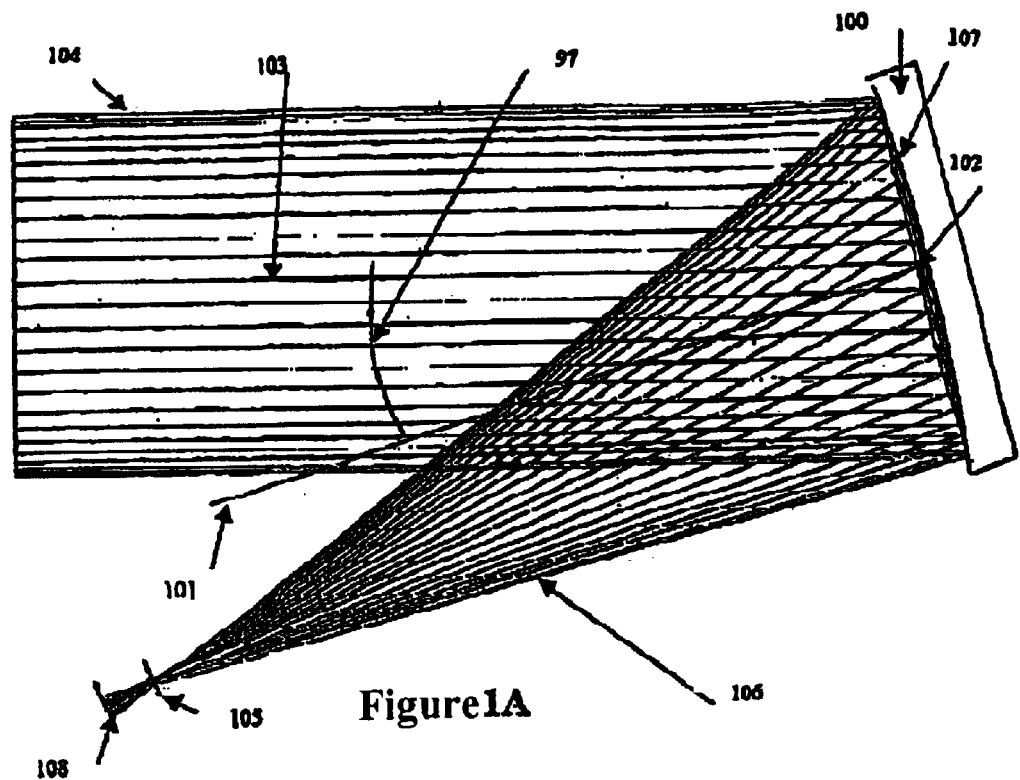
FIGS. 1A and 1B show a known system for non-axial imaging of an object comprising a tilted concave mirror.

FIG. 1A shows an uncorrected system for non-axial imaging of an object onto a focal plane by means of a spherical concave mirror 100. In the example in the drawing, the concave mirror has a radius of curvature of 100 mm. This receives light in the form or an incident beam 104 from a distant point object, not shown in the drawing. The concave mirror 100 is mounted non-axially, which means that the normal 101 to the mirror surface 107 at the point 102 that constitutes the contact point on the said surface 107 of the central ray 103 in the beam 104 forms an angle 97 with the said central ray 103. The said angle 97 has been selected to be sufficiently large that the focal plane 105, in which the rays in the beam 106 converge after reflection in the surface 107 to an approximate point, lies outside of the incident beam 104. The angle of tilt 97 has a value of 13.0° in the example shown. A further focal plane 108 is also specified in FIG. 1A. The focal planes 105 and 108 limit that part of the beam 106 in which the rays are at their most dense.

Figure 1B:
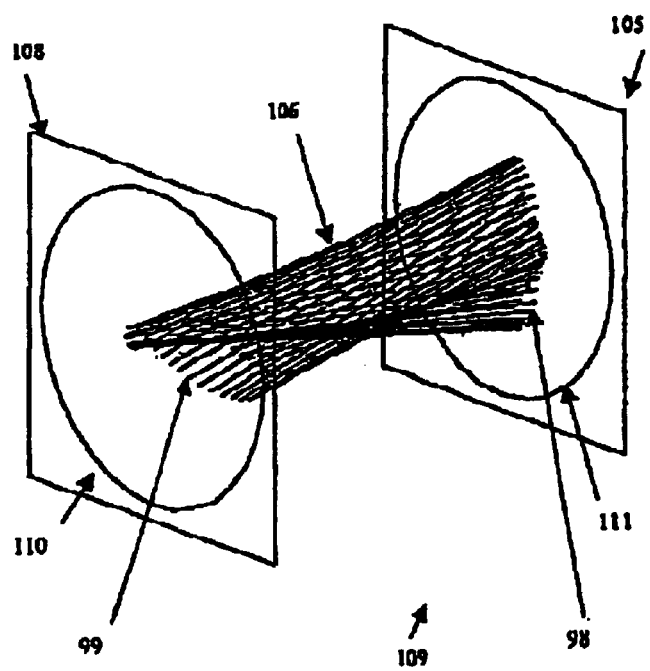

In FIG. 1B, reference numeral 109 shows an enlarged view of that part of the beam path that is limited by the focal planes 108 and 105. The drawing shows the beam path 106 between the said focal planes 105 and 108. The circles 110 and 111 that are contained in the said planes each have, in the example shown, a diameter of 2 mm. The drawing makes it clear that no correct image of the point-shaped object is obtained, since the rays in the beam 106 do not at any point converge to anything that approaches a veil-defined point. The contact point. 98 of the said rays in the plane 105 have an extent that is close to vertical, while corresponding contact points 99 in the plane 108 have an extent that is close to horizontal. The cause of the shape of these distributions is a geometric imaging aberration known as astigmatism.

Furthermore, the rays in the beam 106 are not symmetrically distributed, but demonstrate a center of gravity that lies to one side. This is caused by another similar imaging aberration known as coma. Both astigmatism and coma arise when using rays that form an angle with the optical axis.

Furthermore, a further such imaging aberration that broadens the said image is the aberration known as spherical aberration, that is, the central rays are brought to a focus that lies at another point than the focus to which the peripheral rays are brought.

Figure 2A:
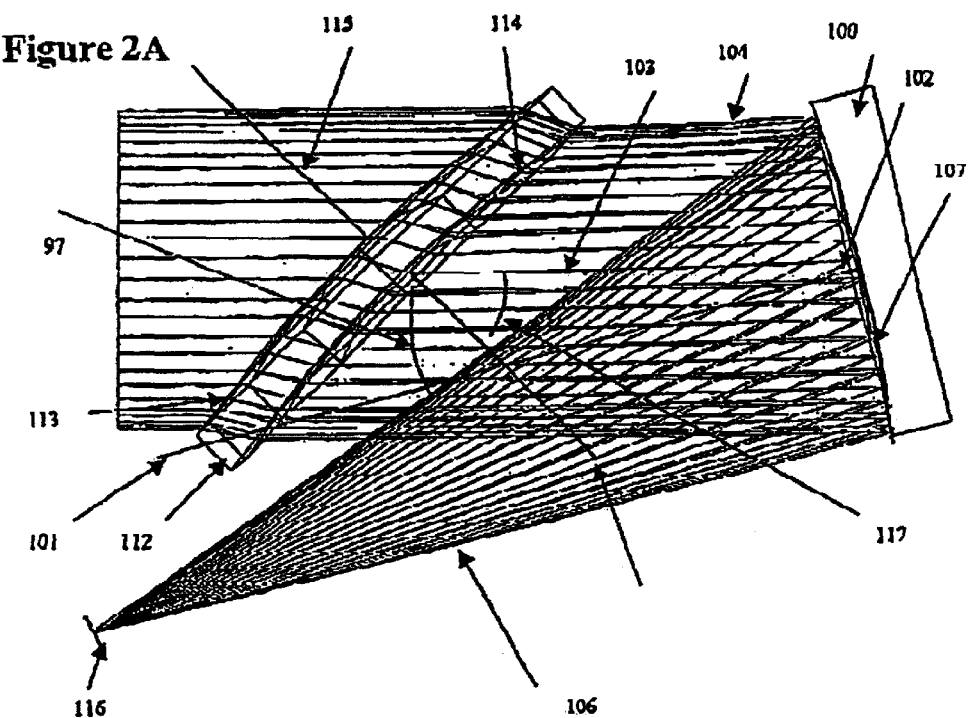
FIGS. 2A, 2B and 2C show a system for imaging according to the invention comprising a tilted concave mirror and a negative lens.

FIG. 2A shows an embodiment of the present invention with the concave mirror 100 shown in FIG. 1. Thus, the mirror 100 is found in FIG. 2A in the same non-axial arrangement as in FIG. 1A, which means that the normal 101 to the mirror surface 107 forms the same angle 97 with the central ray 103 in the incident beam 104 as the angle in FIG. 1A. Furthermore, the exit beam 106 after reflection in the said surface is also found in FIG. 2A. A convex-concave lens 112 has been placed in the incident beam path 104. The convex surface 113 of the lens faces the object. This means that its concave surface 114 faces the mirror 100. The said lens is oriented such that the normals 115 and 118 to the two surfaces 113 and 114, respectively, that pass through the central points of the said lens surfaces, each forms an angle 117 with the central incident ray 103.

In the example shown in FIG. 2A, the two normals 115 and 118 to the Lens coincide with one common normal. The use of generally available software for the optimization of optical systems will allow the angle of tilt 117 of the lens and the radii of curvature of the lens surfaces 113 and 114 to be calculated. Optical aberrations of the image in the focal plane 116 can be minimized with the said software with respect to input free parameters, the values of which will thus be determined when the image has optimal quality, that is, when the contributions from all imaging aberrations are at a minimum. A plurality of wavelengths in the incident light in the beam 104 can be simultaneously included in the said optimization. If in the example shown, quartz glass is chosen as material for the lens, and if the radii of curvature of the lens surfaces 113 and 114, the angle of tilt 117 of the lens and the distance of the focal plane 116 from the point 102 on the surface of the mirror are allowed to constitute parameters in such an optimization, carried out simultaneously for the wavelengths 200 nm, 250 nm, 300 nm, 500 nm and 1,200 nm for the light in the beam 104, the following values are obtained: the radius of curvature for surface 113 is 98.7 mm, the radius of curvature for the surface 114 is 90.2 mm, the angle of tilt 117 is 45.6° and the distance between the focal plane 116 and the central point 102 is 52.6 mm.

Figure 2B:
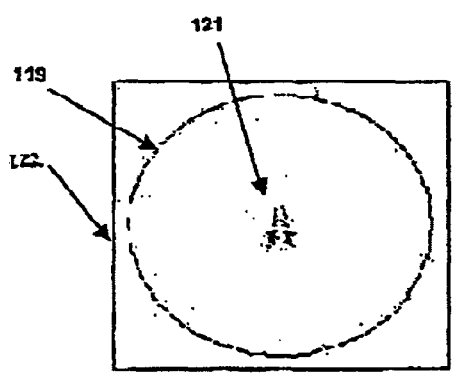

In FIG. 2B, reference numeral 122 specifies an enlarged view of the focal plane 13.6. A circle 119 has been drawn in this plane such that this circle has the same diameter, 2 mm, as the equivalent circles 110 and 111 in FIG. 1B. The points 121 in the center of the surface constitute the meeting points of the rays in the beam 106. The distribution of the said meeting points compared with the equivalent meeting points 99 and 98 in the focal planes 110 and 111 in FIG. 13 demonstrates the advantage that the present invention provides, namely a major reduction in the previously mentioned imaging aberrations.

The image according to the present invention can be further improved by allowing the said lens 112 to be prismatic, that is, a lens in which the normals 115 and 118 to the two lens surfaces do not coincide; instead, the two normals not only form an angle with the central ray 103 but also form an angle mutually with each other. In this way, this angle also can participate as a parameter in the above-mentioned optimization.

Figure 2C:
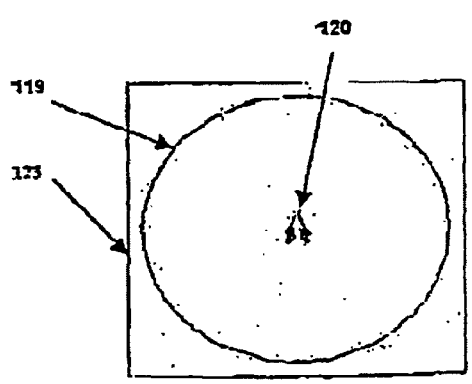

In FIG. 2C, reference numeral 123 denotes another enlarged view of the focal plane 116. The circle 119 is again present in this view, as is the distribution of the meeting point. 120 of the rays in the beam 106 on the said plane, following an optimization with the prismatic angle of the lens as a further variable parameter. The improvement achieved according to the invention becomes clear when the distributions 120 and 121 are compared. However, in many practical applications, the image that a non-prismatic lens 112 according to the invention gives is fully sufficient.

The influence of the tilted lens 112 according to the invention can be understood in that the said lens essentially eliminates the above-mentioned imaging aberrations astigmatism and coma, caused by the tilted mirror 100. The said lens contributes, furthermore, to a reduction of imaging aberrations, such as spherical aberration. If the focal length obtained during the optimization is calculated, a numerical value of −2,370 mm is obtained at a wavelength of 500 nm. Thus, the strength of the lens is low, that is, only −0.42 diopters, which can be compared to the strength of the mirror at 20 diopters. Thus, the mirror is responsible for the dominating focussing, which consequently is the same for all wavelengths of the light, due to the fact that it arises from reflection. The combination according to the invention with the lens 112 corrects with a low refractive index the imaging aberrations of the mirror whereby the effects that depend on wavelength that are caused by the lens are small, and thus do not significantly worsen the imaging.

Figure 3A:
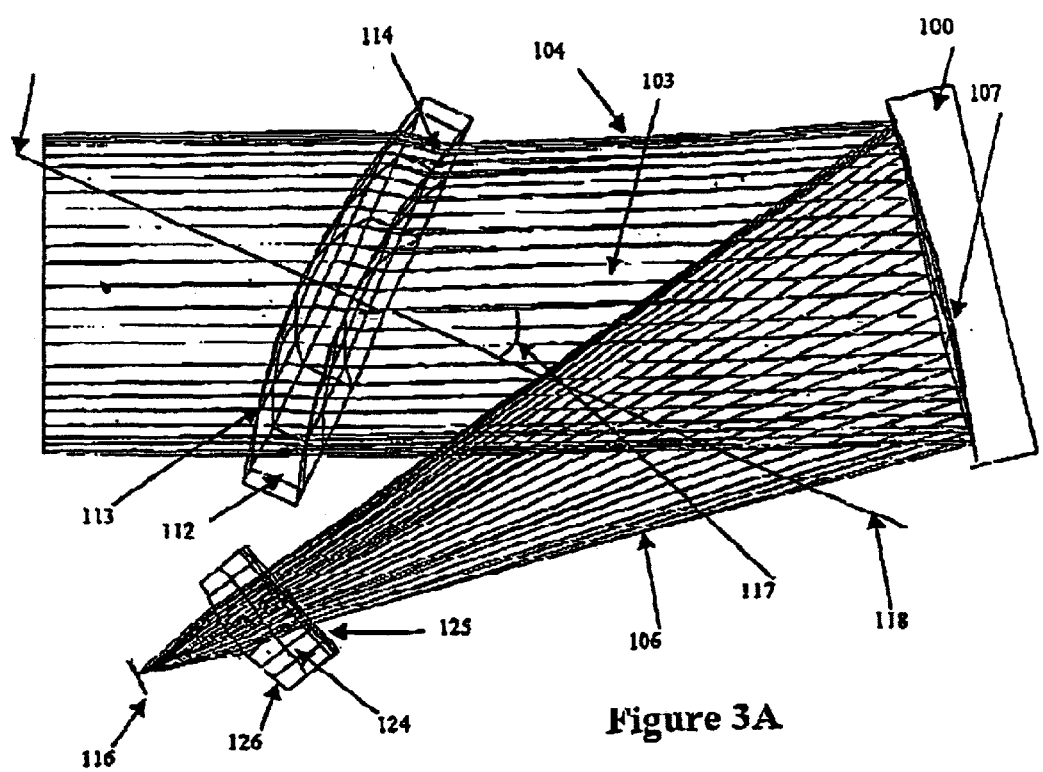
FIGS. 3A, 3B and 3C show a system for imaging according to the invention comprising a tilted concave mirror and two negative lenses.

The image obtained according to the invention can be further improved by, according to the invention, introducing a further tilted correcting lens between the mirror 100 and the focal plane 116. FIG. 3A shows this embodiment. The incident beam 104 with its central ray 103 can again be found in FIG. 3A, as can the lens 112 with its normals 115 and 118, the concave mirror 100 with the reflecting surface 107, and the convergent exit beam 106 following reflection. A lens 124 has been placed between the focal plane 116 and the mirror 100, but outside of the beam 106. This serves the purpose of further improving the quality of the image on the focal plane 116. Both surfaces 125 and 126 of the lens have a cylindrical surface form in the example shown. The cylindrical surface 125, which faces the mirror, is oriented such that the axis of the cylinder of the said surface lieu in the plane that FIG. 3k defines. The other surface 126 of the lens 124, on the other hand, is oriented such that the axis of the cylinder is perpendicular to the plane of FIG. 3A. Thus, the axes of the cylinders of the two lens surfaces 126 and 125 form a right angle to each other. In a manner that is well known to one skilled in the arts, the radii of curvature of the surfaces of the lens can be determined with the aid of the previously mentioned software for optimization of optical systems. Parameters that can be included in this optimization include not only the radii of curvature of the said surfaces 126 and 125, but also the orientation of the lens 124 and its location in the beam 106, the distance between the focal plane 106 and the mirror 100, the radii of curvature of the surfaces 112 and 113 of the lens 112, and, finally, the angle of tilt 117 of the said lens.

Figure 3B:
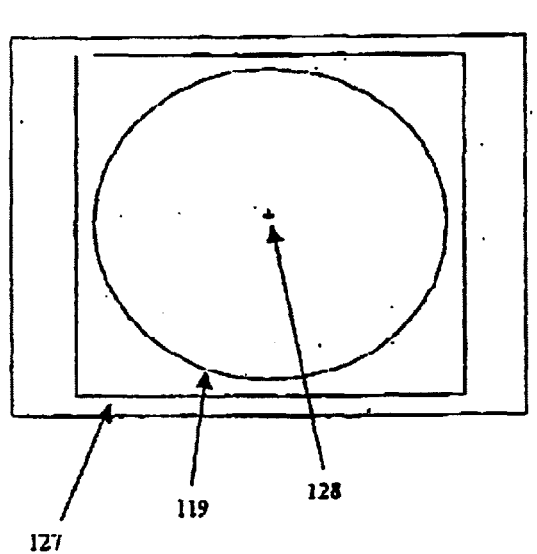

In the same way as in FIGS. 2B and 2C, reference numeral 127 in FIG. 3B specifies a separate view of the focal plane 116. The circle 119 with a diameter of 2 mm is again found in FIG. 3B. The points 128 constitute again the meeting points for the rays in the beam 106 with the focal plane 116. The distribution of the said meeting points shows, when compared with the distribution of meeting points 120 and 121 of equivalent rays shown in FIGS. 2B and 2C, the further improvement in the quality of the image that 1, obtained through the embodiment in FIG. 3A of the present invention.

Figure 3C:
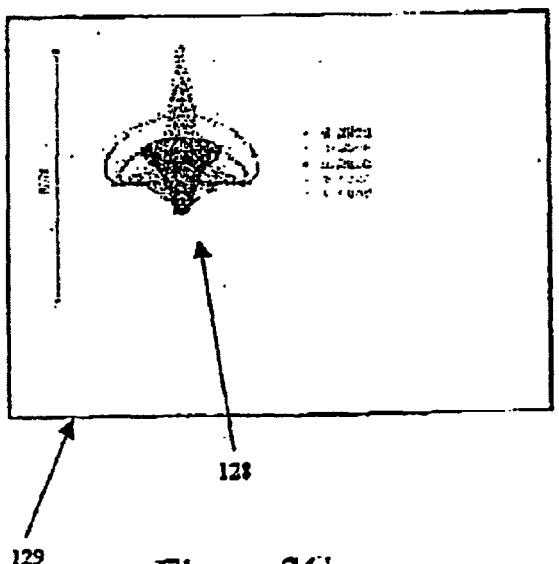

The distribution of the meeting points 128 is shown enlarged in a separate view 129 in FIG. 3C. This is composed of the meeting points for the previously mentioned five different wavelengths between 200 nm and 1,200 nm. The total extent of the meeting points is 0.05 mm and the radial values of what is known as the R.M.S. value of all rays is 0.02 mm. This illustrates the advantage obtained according to the invention, that is, that through the invention it is possible to achieve an image with reduced or eliminated imaging aberrations, operative over a very wide range of wavelengths, which in the example shown is from 200 nm in the UV region, through the visible region, and up to 1,200 nm in the near infra-red region, NIR.

Figure 4:
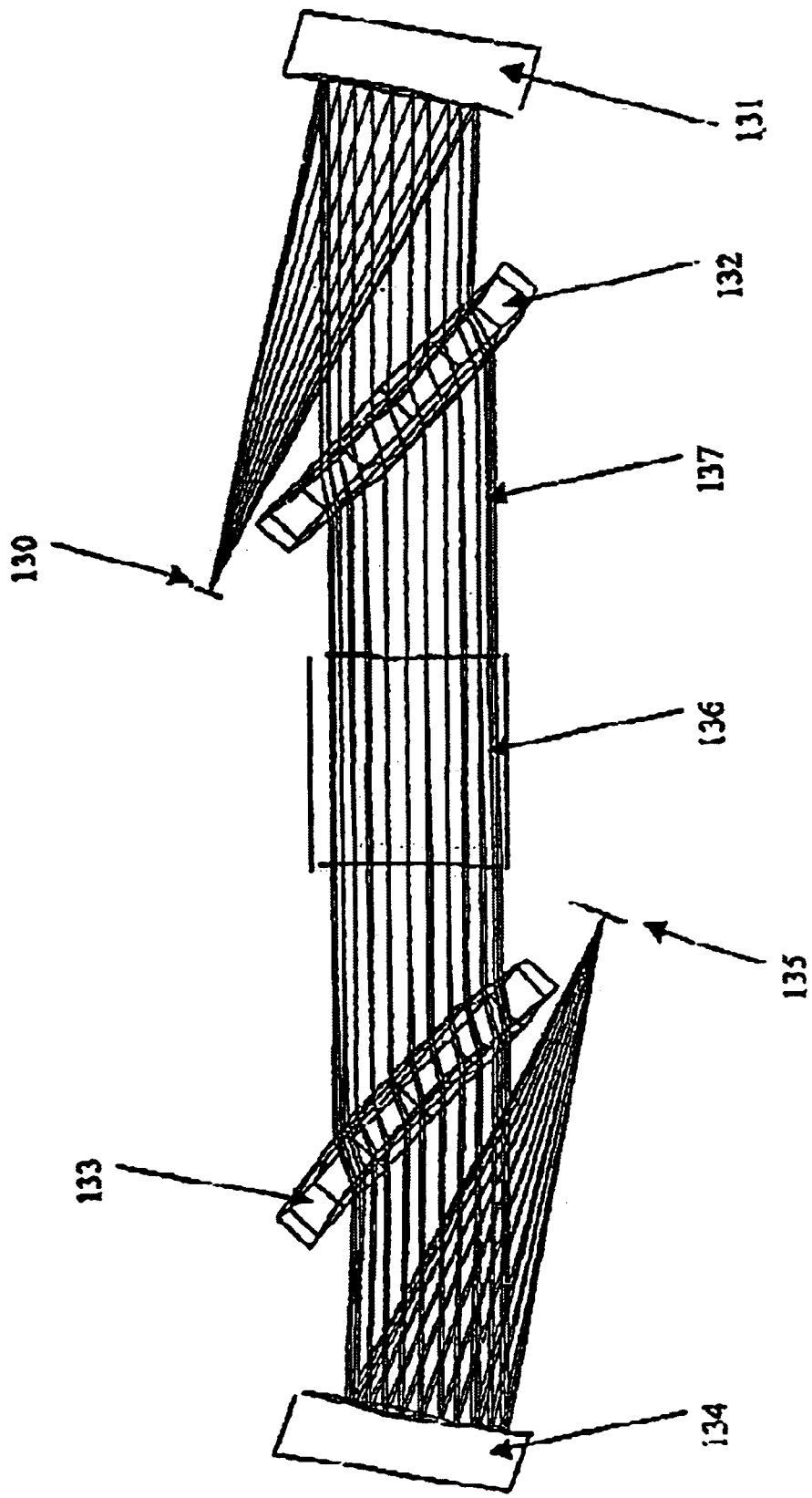
FIG. 4 shows a system according to the invention for collimation and imaging.

FIG. 4 shows a device according to the invention both for collimation and for imaging. A concave mirror 131 is again present in FIG. 4 similar to the concave mirror 100 in FIG. 2A. Analogously, the lens 132 is similar to the lens 112 in FIG. 2A. The lens 132 and the mirror 131 are arranged such that they achieve, according to the inventor, an image in the plane 130 of a putative distant light source. However, a small object, such as, for example, a light source has been placed in the said plane 130. Thus it follows that the beam path through the device according to the invention consisting of the light source 130, the mirror 131 and the lens 132, is reversed. The incident beam 104 shown in FIG. 2A becomes in FIG. 4 an exit beam 137. The exit beam 137 now becomes, according to the invention, unidirectional, or collimated, which means that all rays in the beam 137 are essentially mutually parallel. The collimated rays pass the lens 133, the concave mirror 134 and are finally collected by the focal plane 135, which three latter named objects together form a device according to the invention. The collimated rays are received by the lens 133 and the mirror 134 as if they arise in a distant point object, whereby the image of this object, according to the invention, in the focal plane 135 will be free of imaging aberrations. The light source 130 and the focal plane 135 have been deliberately positioned in FIG. 4 such that they are placed on opposite sides of the common collimated beam 137. This way of applying the invention may prove to be the most advantageous.

The light source 130 can comprise an optical fiber or a round, rectangular or slitshaped opening.

In FIG. 4, reference numeral 136 generally denotes one or several devices through which the collimated light passes. Such a device according to the invention in FIG. 4 may be obtained through allowing 136 to denote what is known as a "cuvette", of known execution, containing a fluid or gaseous specimen that transmits light, whereby the light after passing the focal plane 135 is led onwards to a known device for the measurement of transmission.

Another device according to the invention in FIG. 4 is obtained through allowing 136 to denote one or several optical means of dispersing wavelengths, from the group of prisms or diffraction gratings. The object 130 then comprises an input opening, through which light from a light source, not shown in FIG. 4, passes. The device according to FIG. 4 then demonstrates an optical spectrometer, also known as "spectrograph". A spectrum is obtained in the focal plane 135 that can be recorded using known methods.

The invention is not limited to the embodiments of the same that have been described, but it can be varied in a manner that is obvious to one skilled in the arts within the scope of the subsequent claims.

What is claimed is:

1. A system comprising:
   (a) a concave mirror having a surface normal forming an angle with incident light in a beam path to create an exit beam path; and
   (b) at least one lens cooperating with the concave mirror and being applied in the at least one of the incident beam path and the exit beam path, such that normals to both surfaces of the at least one lens form an angle with a central ray of each beam to which the at least one lens is applied, whereby the mirror and the at least one lens manipulate each of the beams to which the at least one lens is applied in a manner chosen from the group consisting of achieving an optical image of an object in a focal plane outside of the incident beam path with reduction of imaging aberrations in the image and collimating exit light from a light source, wherein the at least one lens is placed at an angle opposite to the angle of the mirror relative to the central ray in the incident beam.

2. A system according to claim 1, wherein the at least one lens is negative whereby the numerical value of its focal length is large relative to the equivalent numerical value of the focal length of the mirror.

3. A system according to claim 1, wherein the concave minor has a surface form which is spherical.

4. A system according to claim 1, wherein the at least one lens is convex-concave.

5. A system according to claim 1, wherein the at least one lens is prismatic.

6. A system according to claim 1, wherein the at least one lens is chosen from the group consisting of a tilted lens arranged in the beam path from the mirror to the focal plane and a tilted lens arranged in the incident beam path.

7. A system according to claim 6, wherein the tilted lens in the beam path from the mirror to the focal plane has two crossed cylindrical surfaces.

8. A system according to claim 1, wherein the light source is chosen from the group consisting of an optical fiber, round opening, rectangular opening and slit-shaped opening.

9. A system according to claim 1, wherein the system comprises not only a system for optical collimating of light from the light source but also a system to achieve the optical image of the object in a focal plane.

10. A system according to claim 9, further including a cuvette arranged in the optically collimated light.

11. A system according to claim 9, further including at least one prism/diffraction grating arranged in the optically collimated light to create a putative collimated beam.

12. A system according to claim 11, wherein the light source and focal plane are arranged on opposite sides of the putative collimated beam that is obtained once consideration is taken of the beam in the prism/diffraction grating.

13. A system according to claim 11, further including a detector for recording the spectrum of the light source placed in the focal plane.

14. A system according to claim 9, wherein the light source and the focal plane are arranged on opposite sides of the collimated beam, the system further including a detector for recording the spectrum of the light source placed in the focal plane.

15. A system comprising:
(a) a concave mirror having a surface normal forming an angle with incident light in a beam path to create an exit beam path; and
(b) at least one lens cooperating with the concave mirror and being applied in the at least one of the incident beam oath and the exit beam path, such that normals to both surfaces of the at least one lens form an angle with a central ray of each beam to which the at least one lens is applied, whereby the mirror and the at least one lens manipulate each of the beams to which the at least one lens is applied in a manner chosen from the group consisting of achieving an optical image of an object in a focal plane outside of the incident beam path with reduction of imaging aberrations in the image and collimating exit light from a light source, wherein the at least one lens is convex-concave.

16. A system comprising:
(a) a concave mirror having a surface normal forming an angle with incident light in a beam path to create an exit beam path; and
(b) at least one lens cooperating with the concave mirror and being applied in the at least one of the incident beam path and the exit beam path, such that normals to both surfaces of the at least one lens form an angle with a central ray of each beam to which the at least one lens is applied, whereby the mirror and the at least one lens manipulate each of the beams to which the at least one lens is applied in a manner chosen from the group consisting of achieving an optical image of an object in a focal plane outside of the incident beam path with reduction of imaging aberrations in the image and collimating exit light from a light source, wherein the at least one lens is chosen from the group consisting of a tilted lens having two crossed cylindrical surfaces, the lens being arranged in the beam path from the mirror to the focal plane, and a tilted lens arranged in the incident beam path.

17. A system according to claim 15, wherein the at least one lens is negative whereby the numerical value of its focal length is large relative to the equivalent numerical value of the focal length of the mirror.

18. A system according to claim 16, wherein the at least one lens is negative whereby the numerical value of its focal length is large relative to the equivalent numerical value of the focal length of the mirror.

19. A system according to claim 15, wherein the system comprises not only a system for optical collimating of light from the light source but also a system to achieve the optical image of the object in a focal plane.

20. A system according to claim 16, wherein the system comprises not only a system for optical collimating of light from the light source but also a system to achieve the optical image of the object in a focal plane.

* * * * *